United States Patent [19]

Lanterman

[11] Patent Number: 5,339,932
[45] Date of Patent: Aug. 23, 1994

[54] APPARATUS AND METHOD TO CUSHION MOVEMENT OF A MEMBER

[75] Inventor: Harold L. Lanterman, Stow, Ohio

[73] Assignee: Teledyne Hyson, Cleveland, Ohio

[21] Appl. No.: 100,766

[22] Filed: Aug. 2, 1993

[51] Int. Cl.⁵ .............................................. F16F 9/02
[52] U.S. Cl. ............................... 188/316; 188/322.17; 188/322.18; 188/322.21; 188/269; 267/119; 267/130
[58] Field of Search ....................... 267/119, 130, 64.15, 267/124, 127, 118; 188/316, 315, 322.15, 322.18, 322.19, 322.22, 269, 322.21, 322.17, 318, 281, 282; 92/168; 72/453.13; 91/417 R, 46; 277/195, 198, 199; 141/5; 184/18

[56] References Cited

U.S. PATENT DOCUMENTS

| | | |
|---|---|---|
| 2,694,567 | 11/1954 | Hoenig . |
| 2,815,254 | 12/1957 | Soman et al. . |
| 4,005,763 | 2/1977 | Wallis . |
| 4,342,448 | 8/1982 | Wallis . |
| 4,423,859 | 1/1984 | Muller . |
| 4,447,047 | 5/1984 | Newell . |
| 4,688,775 | 8/1987 | Kadis . |
| 4,691,902 | 9/1987 | Kadis . |
| 4,765,227 | 8/1988 | Balazs et al. . |
| 4,815,718 | 3/1989 | Kadis . |
| 5,003,807 | 4/1991 | Terrell et al. . |
| 5,172,892 | 12/1992 | Wallis . |
| 5,220,820 | 6/1993 | Terrell et al. ............ 267/119 |

Primary Examiner—Douglas C. Butler
Attorney, Agent, or Firm—Tarolli, Sundheim & Covell

[57] ABSTRACT

An apparatus to cushion movement of a member in a machine includes a piston which divides a cylinder into upper and lower variable volume chambers. A body of lubricating liquid is held in a chamber in the piston. Lubricating liquid is conducted from the chamber in the piston to an annular space between upper and lower seals on a head portion of the piston. During reciprocation of the piston, the lubricating liquid engages the inner side surface of the cylinder. In addition, the lubricating liquid conducts heat away from the cylinder. Fluid pressure is applied against upper side surface of the body of lubricating liquid in the piston chamber by gas pressure conducted from a chamber of the cylinder. During assembly of the apparatus, the piston is inserted part way into the cylinder and a space between seals on the piston is partially filled with lubricating liquid. The piston, with the lubricating liquid between the seals, is fully inserted into the cylinder. In addition, the chamber in the piston is partially filled with lubricating liquid.

39 Claims, 5 Drawing Sheets

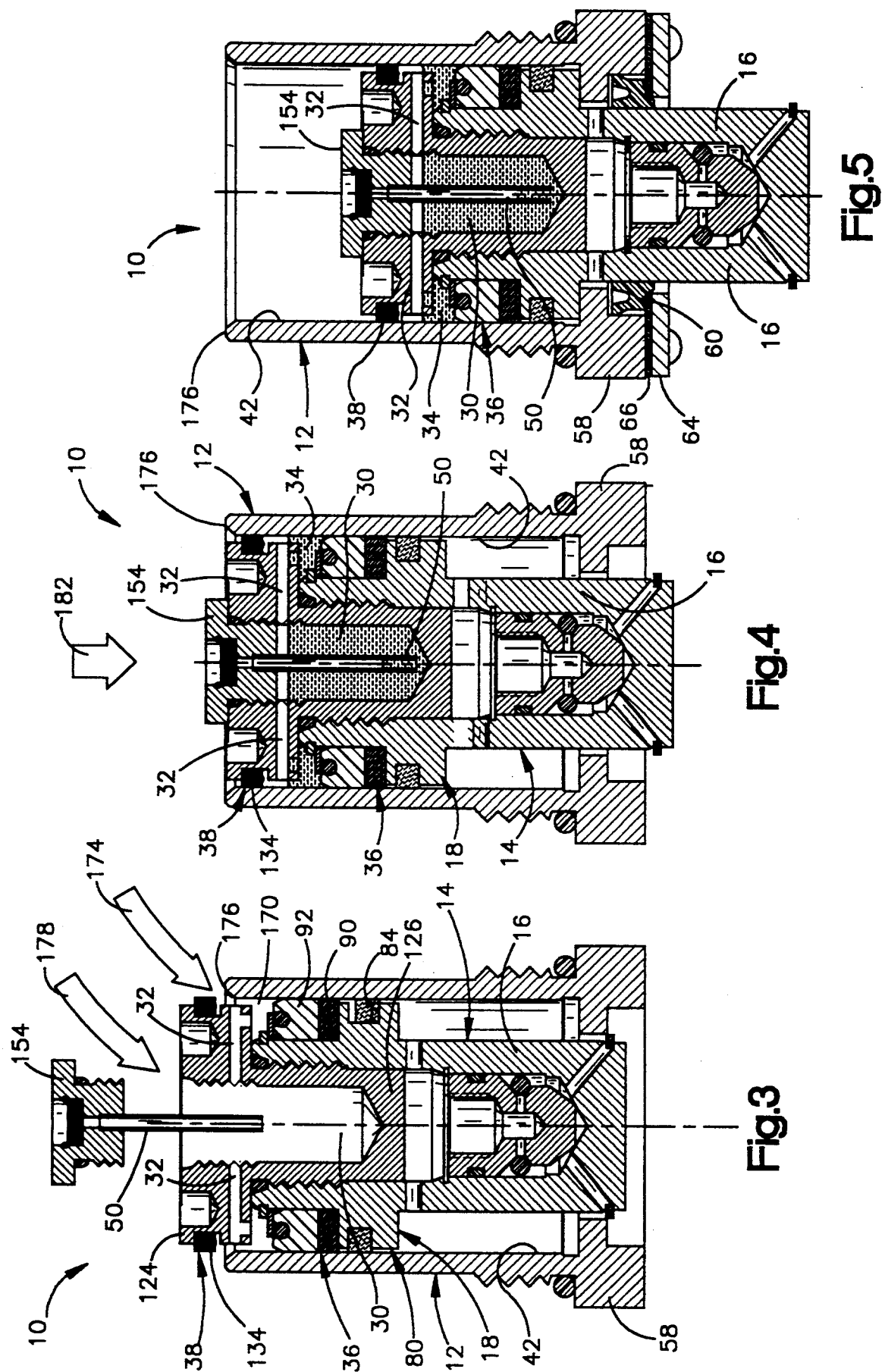

APPARATUS AND METHOD TO CUSHION MOVEMENT OF A MEMBER

BACKGROUND OF THE INVENTION

The present invention relates to a new and improved apparatus and method which are used to cushion movement of a member in a machine and to a method of assembling the apparatus.

A known apparatus to cushion movement of a member in a machine is disclosed in U.S. Pat. No. 4,765,227 entitled Die Cylinder Assembly and issued Aug. 23, 1988. The apparatus disclosed in this patent includes a piston which divides a cylinder into upper and lower variable volume chambers. The lower variable volume cylinder chamber is connected in fluid communication with a source of fluid pressure, that is, nitrogen gas. The fluid pressure applied against the lower end of the piston urges the piston to an extended position. When movement of a member in a machine is to be cushioned, the piston is forced downwardly, by the member, against the influence of the nitrogen gas pressure in the lower variable volume chamber of the cylinder.

The operating life of the apparatus disclosed in the aforementioned U.S. Pat. No. 4,765,227 tends to be maximized if seals between the piston and cylinder are lubricated during operation of the apparatus. Systems for lubricating the seals between a piston and cylinder are disclosed in U.S. Pat. No. 4,688,775 issued Aug. 25, 1987 and entitled Self-lubricating Die Cylinder; U.S. Pat. No. 4,691,902 issued Sep. 8, 1987 and entitled Self-lubricating Die Cylinder; and in U.S. Pat. No. 4,815,718 issued Mar. 28, 1989 and entitled Self-lubricating Die Cylinder. The apparatus disclosed in these patents utilize fluid pressure to pump lubricating liquid which is sprayed against surfaces of the piston and cylinder.

SUMMARY OF THE PRESENT INVENTION

The present invention provides a new and improved method and apparatus to cushion movement of a member in a machine. The apparatus includes a piston which is disposed in a cylinder and divides the cylinder into variable volume chambers. A body of lubricating liquid is held in a chamber in the piston. Lubricating liquid is conducted from the piston chamber to a space between upper and lower seals on the piston. During reciprocation of the piston in the cylinder, the body of lubricating liquid in the piston is reciprocated with the piston. In addition, lubricating liquid is exposed to the side wall of the cylinder to lubricate the cylinder and seals connected with the piston.

An upper side surface of the body of lubricating liquid in the piston is exposed to a relatively high fluid pressure. This fluid pressure may be conducted from one of the variable volume cylinder chambers.

In one embodiment of the invention, the fluid pressure from one of the variable volume chambers is conducted through the body of lubricating liquid in the piston. Thus, a lower end of a conduit is connected in fluid communication with the variable volume cylinder chamber. The upper end of the conduit is disposed above an upper side surface of the body of lubricating liquid in the piston.

In another embodiment of the invention, lubricating liquid is conducted upwardly from a lower end portion of the body of lubricating liquid in the piston to a space between seals on the piston. In this embodiment of the invention, a passage for conducting lubricating liquid extends above an upper surface of the body of lubricating liquid in the piston to the space between the seals on the piston.

In both embodiments of the invention, during reciprocation of the piston in the cylinder, the body of lubricating liquid in the piston is reciprocated with the piston. As the lubricating liquid reciprocates, the lubricating liquid circulates in such a manner to transfer heat away from the cylinder. At the same time, movement of lubricating liquid along an inner side surface of the cylinder applies lubricating liquid to the inner side surface of the cylinder.

To assemble the apparatus, the piston is partially inserted into the cylinder. A space between the seals on the piston may be at least partially filled with lubricating liquid. The piston is then inserted further into the cylinder. In addition, the chamber in the piston is at least partially filled with lubricating liquid.

BRIEF DESCRIPTION OF THE DRAWINGS

The foregoing and other features of the present invention will become more apparent upon a consideration of the following description taken in connection with the accompanying drawings wherein:

FIG. 3 is a schematic illustration depicting the manner in which an annular space between a piston and cylinder and a chamber in the piston are partially filled with lubricating liquid during assembly;

FIG. 4 is a schematic illustration, generally similar to FIG. 3, illustrating the manner in which the piston is further inserted into the cylinder after the space between the piston and cylinder has been partially filled with lubricating liquid;

FIG. 5 is a schematic illustration, generally similar to FIGS. 3 and 4, illustrating the manner in which a wiper is secured to the cylinder during assembly;

DESCRIPTION OF SPECIFIC PREFERRED EMBODIMENTS OF THE INVENTION

General Description

Figure 1:
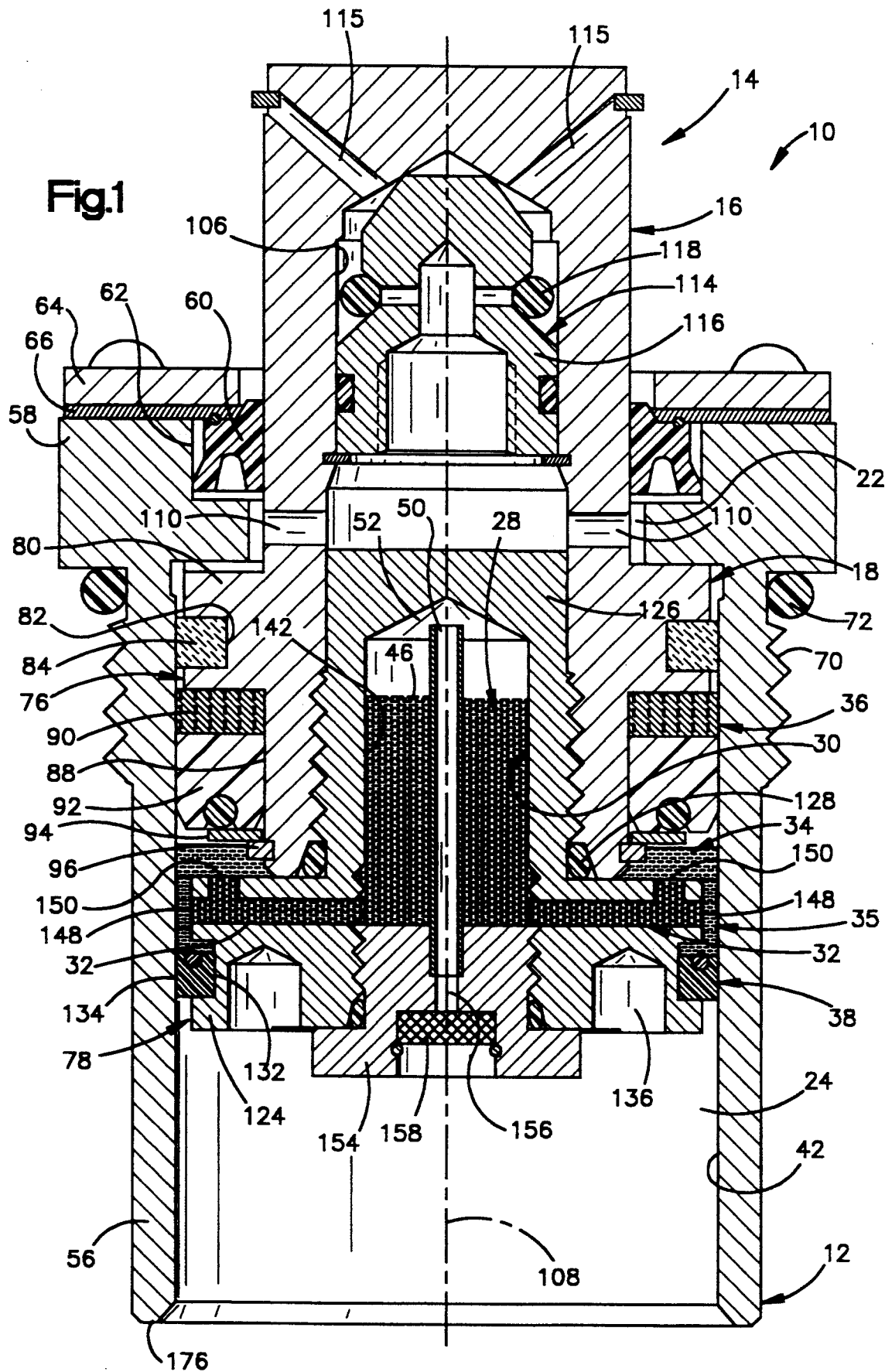
FIG. 1 is a sectional view of a piston and cylinder assembly constructed in accordance with the present invention, the piston and cylinder assembly being illustrated in an extended condition.

An apparatus 10 for cushioning movement of a member in a machine is illustrated in FIG. 1. The apparatus 10 includes a cylinder 12 and a piston 14. The piston 14 includes a piston rod 16 and a piston head 18. The piston head 18 divides the inside of the cylinder 12 into an upper variable volume chamber 22 and a lower variable volume chamber 24.

The piston rod 16 is engageable by a component of a machine to cushion movement of the component of the machine during operation of the machine. Thus, force is applied against the piston rod 16 by the machine component. The force applied against the piston rod 16 moves the piston head 18 downwardly against the influence of fluid pressure in the lower variable volume chamber 24 to cushion movement of the machine component.

In accordance with one of the features of the present invention, a first body 28 of lubricating liquid is disposed in the piston 14. The first body 28 of lubricating liquid (oil) is contained in a cylindrical chamber 30 in the piston 14. Passages 32 extend radially outward from the piston chamber 30 to an annular space 34.

A second body 35 of lubricating liquid is located in the annular space 34. The second body 35 of lubricating liquid (oil) is disposed between an annular upper seal 36 and an annular lower seal 38 on the piston head 18. The second body 35 of lubricating liquid is connected in fluid communication with the first body 28 of lubricating liquid by the passages 32. The second body 35 of lubricating liquid is coaxial with and circumscribes the first body of lubricating liquid.

During reciprocation of the piston 14 relative to the cylinder 12, lubricating liquid is applied to a cylindrical inner side surface 42 of the cylinder 12. This enables the upper seal 36 and the lower seal 38 to be fully lubricated during reciprocation of the piston 14 relative to the cylinder 12. In addition, the lubricating liquid circulates in the piston chamber 30, passages 32 and annular space 34 to transfer heat away from the inner side surface 42 of the cylinder 12. The body 35 of lubricating liquid provides a fluid seal between the upper variable volume chamber 22 and the lower variable volume chamber 24.

In accordance with another feature of the invention, fluid pressure is applied against an upper side surface 46 of the body 28 of lubricating liquid. The pressure applied against the upper side surface 46 of the body 28 of lubricating liquid is transmitted through the lubricating liquid in the passages 32 to the second body 35 of lubricating liquid. The fluid pressure presses the lubricating liquid against the inner side surface 42 of the cylinder 12 and against the lower seal 38.

In the embodiment of the invention illustrated in FIG. 1, fluid pressure which is applied to the upper side surface 46 of the body 28 of lubricating liquid is conducted from the lower variable volume chamber 24 through a tubular standpipe or conduit 50. The conduit 50 is connected in fluid communication with the lower variable volume chamber 24. The conduit 50 extends through the body 28 of lubricating liquid to an upper end portion 52 of the piston chamber 30. If desired, the conduit 50 could be formed by passages in the piston 14.

Cylinder

The cylinder 12 includes a cylindrical sleeve 56 and an annular head end 58. The steel sleeve 56 and head end 58 are formed as one piece. An annular wiper 60 is disposed in an annular groove 62 formed in the head end 58. The wiper 60 is held in the groove 62 by an annular retainer plate 64 and gasket 66 which are secured to the head end 58 by suitable fasteners. The wiper 60 sealingly engages a cylindrical outer side surface of the piston rod 16.

External threads 70 are formed on the outside of the sleeve 56. The threads 70 are engageable with internal threads on a manifold block (not shown). An 0-ring seal 72 will seal a connection between the cylinder 12 and the manifold block. Although the sleeve 56 could be mounted on a manifold block in many different ways, it is preferred to mount the sleeve on a manifold block in the manner disclosed in U.S. Pat. Nos. 4,688,775 and 4,765,227.

When the cylinder 12 is mounted on the manifold block, a lower end portion of the sleeve 56 extends into a chamber in the manifold block. The manifold block chamber is connected with a source of fluid pressure, that is, nitrogen gas. The nitrogen gas can flow freely between the manifold block chamber and the lower variable volume chamber 24 of the cylinder 12. The nitrogen gas pressure in the lower variable volume chamber 24 urges the piston 14 upward to the extended position shown in FIG. 1.

To cushion movement of a member in a machine, force is applied to the piston rod 16 by the member. The piston 14 is moved downward in the cylinder 12 from the extended position shown in FIG. 1 to the retracted position shown in FIG. 2. The nitrogen gas pressure in the lower variable volume chamber 24 opposes downward movement of the piston 14.

When the force applied against the piston 14 by the machine member is reduced, the nitrogen gas pressure in the lower variable volume chamber 24 moves the piston upward (as viewed in FIG. 2) to the extended position of FIG. 1. It is contemplated that the apparatus 10 may be used in many different types of machines to cushion movement of many different types of members. However, it is believed that the apparatus 10 will be particularly advantageous when used as a die cushion in a metal forming press in the manner disclosed in U.S. Pat. No. 4,765,227.

Piston

The piston 14 includes a one piece hollow main section 76 and a one piece hollow secondary section 78. The steel main section 76 of the piston includes an upper part 80 of the piston head 18 and the piston rod 16. The cylindrical upper part 80 of the piston head 18 includes an annular recess 82 in which an annular wiper 84 is disposed. The annular wiper 84 engages the cylinder inner side surface 42 of the cylinder 12.

A downwardly facing annular recess 88 is formed on the upper part 80 of the piston head 18. The recess 88 receives an annular bearing 90 and U-cup seal 92 which sealingly engage the inner side surface 42 of the cylinder 12. An annular washer 94 and retainer ring 96 hold the bearing 90 and U-cup seal 92 in place in the recess 88. The wiper 84, bearing 90 and U-cup seal 92 cooperate with the piston head 18 to form the annular upper seal 36 between the piston head 18 and the cylinder 12. Of course, the upper seal 36 could have a different construction if desired.

The hollow cylindrical piston rod 16 is formed as one piece with the hollow upper part 80 of the piston head 18. A generally cylindrical cavity 106 extends from an upper end portion of the piston rod 16 downwardly to the lower end of the upper part of the piston head 18. The piston rod 16, piston head 18 and chamber 106 are coaxial with a vertical (as viewed in FIG. 1) central axis 108 of the cylinder 12. The piston rod 16 has radially extending passages 110 which connect the upper portion of the chamber 106 in fluid communication with upper variable volume chamber 22 of the cylinder 12.

A relief valve assembly 114 is disposed in an upper end portion of the chamber 106. The relief valve assembly 114 is vented to the atmosphere around the apparatus 10 by vent passages 115. When the fluid pressure in the upper variable volume chamber 22 of the cylinder 12 exceeds a predetermined pressure, the relief valve assembly 114 is actuated. Actuation of the relief valve assembly 114 vents the upper variable volume chamber 22 to the atmosphere. This prevents the buildup of excessive fluid pressure in the upper variable volume chamber 22.

Although the relief valve assembly 114 could have many different constructions, in the illustrated embodiment of the invention, the relief valve assembly 114 includes a hollow base member 116 and a vent valve ring 118. Fluid pressure is conducted from the upper variable volume chamber 22 through the radial passages 110 into the chamber 106. This fluid pressure is conducted into the hollow base member 116. Excessive fluid pressure causes the resilient material of the annular vent valve ring 118 to deform radially outward and vent the upper variable volume chamber to the atmosphere through the vent passages 115.

The hollow one piece secondary section 78 forms the lower portion of the piston head 18. The aluminum secondary section 78 includes a cylindrical base 124 and a cylindrical central portion 126. The cylindrical central portion 126 is coaxial with the base 124 and the central axis 108 of the cylinder 12. The cylindrical central portion 126 has a smaller diameter than the base 124.

The central portion 126 of the secondary section 78 is telescopically received in the chamber 106 in the hollow main section 76 of the piston 14. External threads on the hollow central portion 126 cooperate with internal threads on the main section 76 to securely connect the secondary section 78 with the main section 76. An O-ring seal 128 blocks leakage of fluid between the central portion 126 of the secondary section 78 and the upper part 80 of the main section 76 of the piston head 18.

The base 124 of the secondary section 78 has an annular recess 132 which receives an annular lower U-cup seal 134. The annular lower U-cup seal 134 forms the lower seal 38. Of course, the lower seal 38 could have a different construction if desired.

Recesses 136 are formed in the base 124 of the secondary section 78. The recesses 136 receive a spanner wrench to rotate the secondary section 78 relative to the main section 76 of the piston head 18 during assembly of the piston 14.

The piston chamber 30 is coaxial with the cylindrical base 124 and cylindrical central portion 126 of the secondary section 78. Thus, the central axis of the piston chamber 30 is coincident with the vertical central axis 108 of the cylinder 12.

The passages 32 extend radially outward from a cylindrical main section 142 of the piston chamber 30 to the annular space 34 disposed between the upper seal 36 and lower seal 38. Each of the passages 32 has a radially outward facing opening 148 and an axially upward facing opening 150. By having two openings 148 and 150 from each of the passages 32, circulation of lubricating liquid between the bodies 28 and 35 of lubricating liquid through the passages is facilitated.

An externally threaded plug 154 having a hexagonal head, blocks the lower end of the piston chamber 30. The lower end of the standpipe or conduit 50 is fixedly secured to the plug 154. The lower end of the conduit 50 is vented to the lower variable volume chamber 24 through a passage 156 in the plug and a filter 158. The passage 156 and conduit 50 conduct fluid under pressure, that is, nitrogen gas under pressure, from the lower variable volume chamber 24 through the body 28 of lubricating liquid to the upper end portion 52 of the piston chamber 30.

The nitrogen gas pressure applied against the upper side surface 46 of the body 28 of lubricating liquid is transmitted through the lubricating liquid in the passages 144 to the body 35 of lubricating liquid in the annular space 34. The body 35 of lubricating liquid in the annular space 34 cooperates with the upper seal 36 and lower seal 38 to further block leakage of nitrogen gas from the lower variable volume chamber 24 to the upper variable volume chamber 22.

It is contemplated that the apparatus 10 may be stored on its side, that is, with the central axis 108 horizontal. To enable this to be done, the viscosity of the lubricating liquid and the porosity of the filter 158 are such that the lubricating liquid 28 does not flow through the filter. For example, the lubricating liquid 28 may have a viscosity of approximately 1100 saybolt universal seconds and the filter 158 has a 20 micron rating.

Assembly

When the apparatus 10 is to be assembled, the piston 14 is inserted part way into the cylinder 12 (FIG. 3). At this time, the upper seal 36 sealingly engages the inner side surface 42 of the cylinder 12 while the lower seal 38 is spaced from the cylindrical inner side surface of the cylinder, in the manner shown in FIG. 3. This results in the formation of an annular space 170 which, when the piston 14 is fully inserted into the cylinder 12 (FIG. 4), becomes the space 34. The U-cup seal 92 extends between the upper part 80 of the piston head 18 and the inner side surface 42 of the cylinder 12 to form an annular lower side of the space 170.

After the piston 14 has been inserted part way into the cylinder 12, lubricating liquid is poured into the space 170, in the manner indicated schematically by the arrow 174 in FIG. 3. Lubricating liquid (oil) is poured into the space 170 until the lubricating liquid almost flows out of the cylinder 12. Thus, the lubricating liquid in the space will closely approach an annular end surface 176 of the cylinder 12.

At the same time, the piston chamber 30 is partially filled with lubricating liquid, in the manner indicated schematically by the arrow 178 in FIG. 3. The piston chamber 30 is filled with lubricating liquid until the upper side surface (as viewed in FIG. 3) of the body of lubricating liquid reaches the lower edges of the passages 32. Thus, the annular space 34 (FIG. 4) and piston chamber 30 are only partially filled with lubricating liquid.

The piston 14 is then moved axially downward (as viewed in FIG. 3) in the manner indicated schematically by the arrow 182 in FIG. 4. This results in the U-cup seal 134 of the lower seal 38 being moved into sealing engagement with the inner side surface 42 of the cylinder 12 to seal the annular space 34 which is partially filled with lubricating liquid. Gas (air) is trapped in the upper portion of the annular space 34.

The plug 154 is inserted into the piston 18 and tightened to close the piston chamber 30. At this time, the piston chamber 30 will be filled with oil up to the lower edge portion of the passages 32. The space in the piston chamber 30 above (as viewed in FIG. 4) the lower edges of the passages 32 contains gas (air).

It should is to be understood that the space 170 (FIG. 3) and piston chamber 30 could be partially filled with lubricating liquid in any desired sequence. Thus, the piston chamber 30 could be partially filled with lubricating liquid and closed with the plug 154 before the space 170 is partially filled with lubricating liquid. Similarly, the space 170 could be partially filled with lubricating liquid and the piston moved axially into the cylinder 12 to the position shown in FIG. 4, before the piston chamber 30 is partially filled with lubricating liquid and closed with the plug 154. If desired the lubricating liquid could be supplied to only the piston chamber 30 and conducted from the piston chamber 30 to the space 170.

After the space 34 and piston chamber 30 have been partially filled with lubricating liquid, the piston 14 is moved downward to the position shown in FIG. 5. The annular wiper 60 is then telescoped around the piston rod 16. The retainer ring 64 and gasket 66 are then secured in place to hold the wiper 60 against movement relative to the cylinder 12.

Operation

After the apparatus 10 has been assembled in the manner indicated schematically in FIGS. 3-5, the apparatus is inserted into a machine in the upright orientation illustrated in FIG. 1. During operation of the machine, force is applied against the piston rod 16. This force moves the piston 14 downward from the extended position of FIG. 1 to the retracted position of FIG. 2 against the influence of the fluid pressure in the lower variable volume chamber 24. As this occurs, the upper variable volume chamber 22 expands.

The resistance to downward movement provided by the fluid pressure, that is, nitrogen gas, in the lower variable volume chamber 24 causes the piston 14 to cushion movement of a member in a machine. As soon as the force applied to the piston is reduced by continued operation of the machine, the fluid pressure in the lower variable volume chamber 24 causes the piston 14 to move upward from the retracted position of FIG. 2 back to the extended position of FIG. 1.

During continued operation of the machine and repeated reciprocation of the piston 14 relative to the cylinder 12, the lubricating liquid in the body 28 of lubricating liquid is applied to the inner side surface 42 of the cylinder 12. The lubricating liquid applied to the inner side surface 42 of the cylinder 12 lubricates the upper and lower seals 36 and 38 during reciprocation of the piston. Of course, this tends to enhance the operating life of the apparatus 10.

During reciprocation of the piston 14 relative to the cylinder 12, the lubricating liquid in the bodies 28 and 35 of lubricating liquid circulate. This transfers heat away from the inner side surface 42 of the cylinder 12. The heat is transferred to the body 28 of lubricating liquid and to the central portion 126 of the secondary section 78 of the piston 14.

During reciprocation of the piston 14, the fluid pressure in the lower variable volume chamber 24 varies. The variations in fluid pressure in the lower variable volume chamber 24 are transmitted through the body 28 of lubricating liquid to the gas (air) in the upper end of the piston chamber 30 by the conduit 50. The variations in fluid pressure are transmitted through the lubricating liquid in the piston chamber 30, passages 32 and space 34 to the gas (air) trapped in the space 34.

Figure 2:
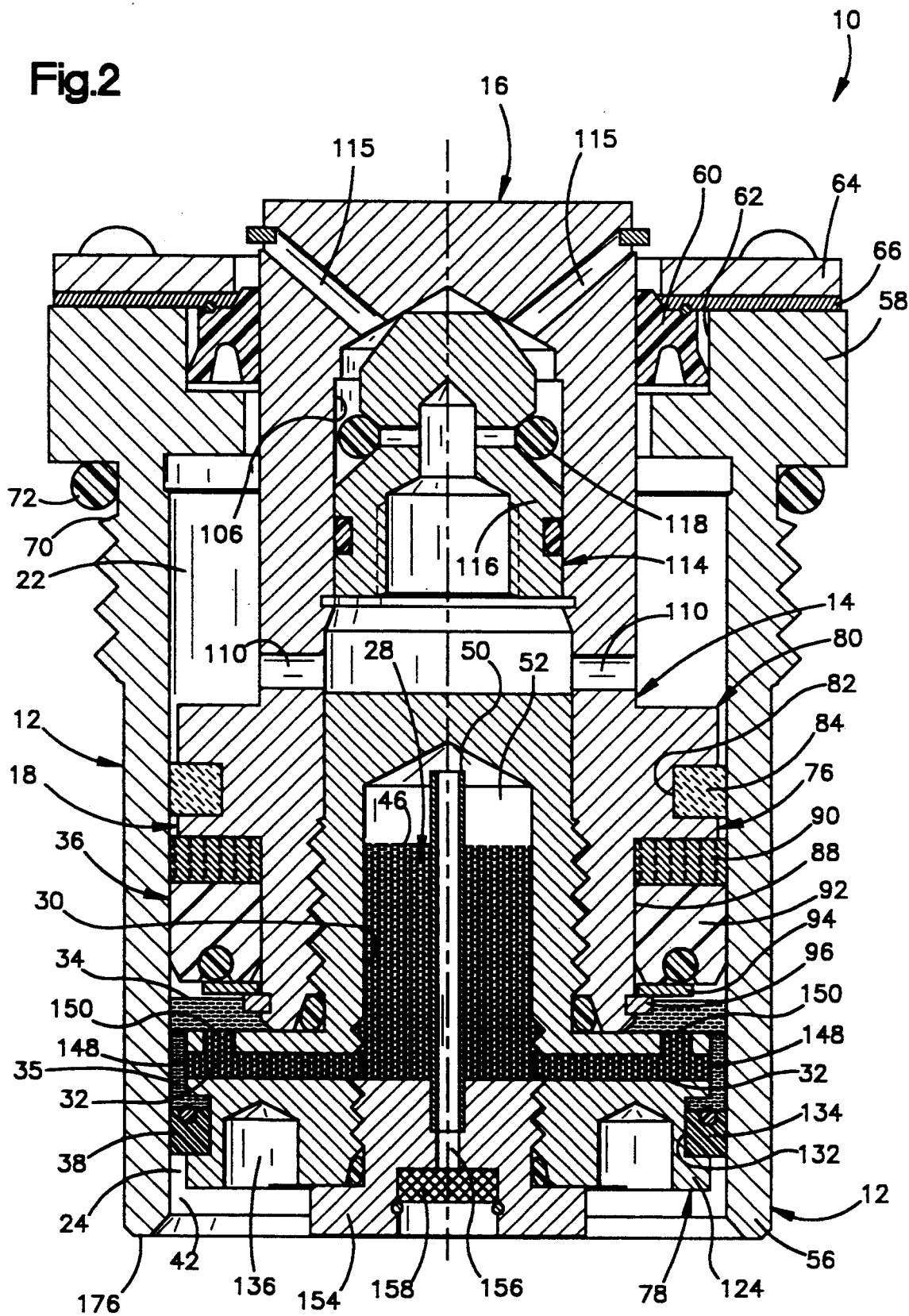
FIG. 2 is a sectional view, generally similar to FIG. 1, of the piston and cylinder assembly in a retracted condition.

When the fluid pressure in the lower variable volume chamber 24 increases as the piston 14 moves from the extended position of FIG. 1 to the retracted position of FIG. 2, the increase in fluid pressure compresses the gas in the upper portion of the space 34. This results in a flow of lubricating liquid into the space 34.

When the fluid pressure in the lower variable volume chamber 24 decreases the piston 14 moves from the retracted position of FIG. 2 to the extended position of FIG. 1, the decrease in fluid pressure causes the gas in the upper portion of the space 34 to expand. This results in a flow of lubricating liquid out of the space 34 through the passages 32. Thus, the bodies of gas (air) trapped in the upper portion of the piston chamber 30 and the upper portion of the space 34 provide a pumping action as the pressure in the lower variable volume chamber 24 varies during reciprocation of the piston 14.

In addition, forces applied to the bodies 28 and 35 of lubricating liquid by the piston 14, as the piston reciprocates back and forth relative to the cylinder 12, causes the lubricating liquid to circulate. By providing the passages 32 with both radially outward facing openings 148 and axially upward facing openings 150, the circulation of the lubricating liquid in the passages 32 and the transfer of heat from the inner side surface 42 of the cylinder 12 is facilitated.

Second Embodiment

Figure 6:
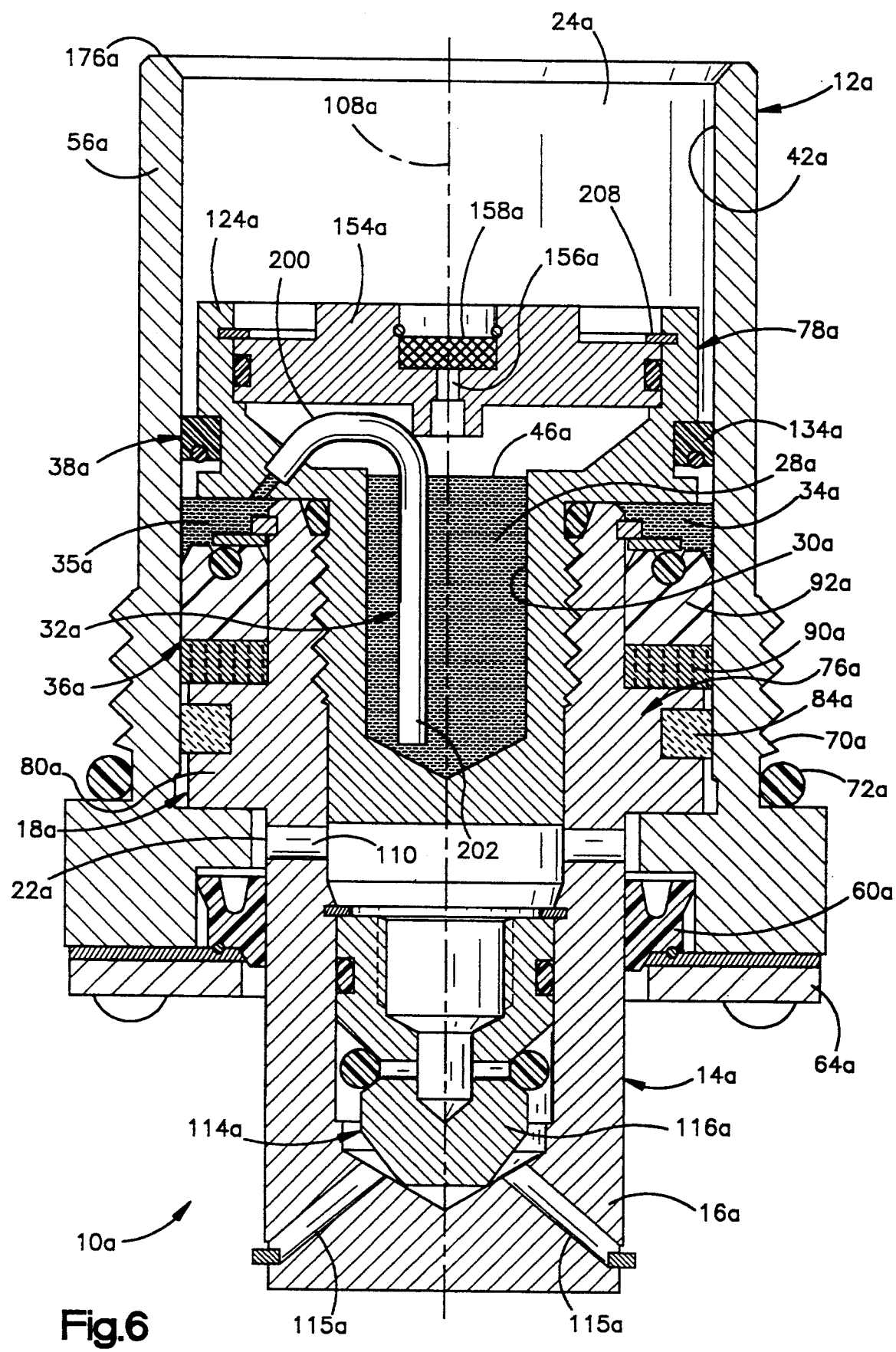
FIG. 6 is a sectional view of a second embodiment of the piston and cylinder assembly.

In the embodiment of the invention illustrated in FIGS. 1-5, the apparatus 10 is positioned in a machine in an upright orientation in which the piston rod 16 extends upward, that is in the orientation shown in FIGS. 1 and 2. However, various machines may require mounting of the apparatus 10 in an inverted orientation with the piston rod 16 extending downward. The embodiment of the invention illustrated in FIG. 6 is intended for use in the inverted orientation shown in FIG. 6. Since the embodiment of the invention illustrated in FIG. 6 is generally similar to the embodiment of the invention illustrated in FIGS. 1-5, similar numerals will be utilized to designate similar components, the suffix letter "a" being associated with the numerals of FIG. 6 to avoid confusion.

An apparatus 10a for cushioning movement of a member in a machine includes a cylinder 12a and a piston 14a. The piston 14a includes a piston rod 16a and a piston head 18a. The piston head 18a divides the inside of the cylinder 12a into a lower variable volume chamber 22a and an upper variable volume chamber 24a.

The piston rod 16a is engageable by a component of a machine to cushion movement of the component of the machine during operation of the machine. Thus, force is applied against the piston rod 16a by the machine component. The force applied against the piston rod 16a moves the piston head 18a upward against the influence of fluid pressure in the upper variable volume chamber 24a to cushion movement of the machine component.

A first body 28a of lubricating liquid, that is, oil, is disposed in the piston 14a. The first body of lubricating liquid is contained in and partially fills a cylindrical chamber 30a in the piston 14a. A second body 35a of lubricating liquid is located in and partially fills a space 34a which circumscribes the piston 14a and the first body 28a of lubricating liquid.

In accordance with a feature of this embodiment of the invention, a passage 32a is formed in a conduit 200. The conduit 200 has a lower end portion 202 which is disposed in the lower end portion of the piston chamber 30a. The conduit 200 extends upward through an upper side surface 46a of the body 28a of lubricating liquid in the piston chamber 30a. The conduit 200 then extends radially outward and downward and is connected in fluid communication with the body 35a of liquid in the annular space 34a. The conduit 200 is filled with lubricating liquid. If desired, the conduit 200 could be formed by passages in the piston 14a.

The second body 35a of liquid is disposed between an annular lower seal 36a and an annular upper seal 38a on the piston head 18a. The second body 35a of lubricating liquid is connected in fluid communication with the first body 28a of lubricating liquid by the passage 32a which extends through the conduit 200. The second body 35a of lubricating liquid (oil) is coaxial with and circumscribes the first body 28a of lubricating liquid.

During reciprocation of the piston 14a relative to the cylinder 12a, lubricating liquid is applied to a cylindrical inner side surface 42a of the cylinder 12a. This enables the lower seal 36a and the upper seal 38a to be fully lubricated during reciprocation of the piston 14a relative to the cylinder 12a. In addition, force is applied to the first and second bodies 28a and 35a of lubricating liquid during reciprocation of the piston 14a. This force causes the lubricating liquid to circulate in the piston chamber 30a, passage 32a and annular space 34a in such a manner as to transfer heat away from the inner side surface 42a of the cylinder 12a. In addition, the body 35a of lubricating liquid provides a fluid seal between the lower variable volume chamber 22a and the upper variable volume chamber 24a.

Fluid pressure is applied against an upper side surface 46a of the body 28a of lubricating liquid. The fluid pressure applied against the upper side surface 46a of the body 28a of lubricating liquid is transmitted through the lubricating liquid in the passage 32a to the second body 35a of lubricating liquid. The fluid pressure presses the lubricating liquid against the inner side surface 42a of the cylinder 12a and against the lower seal 36a. During reciprocation of the piston 14a in the cylinder 12a, variations in the fluid pressure in the upper variable volume chamber 24a results in a pumping action which is the same as previously explained in conjunction with the embodiment of the invention illustrated in FIGS. 1 and 2.

In the embodiment of the invention illustrated in FIG. 6, fluid pressure which is applied against the upper side surface 46a of the body 28a of lubricating liquid is conducted from the upper variable volume chamber 24a through a filter 158a and passage 156a formed in a plug 154a. It should be noted that in the embodiment of the invention illustrated in FIG. 6, it is not necessary to provide a standpipe, corresponding to the standpipe 50 of the embodiment of the invention illustrated in FIGS. 1 and 2. This is because the upper side surface 46a of the body 28a of lubricating liquid faces upwardly toward the plug 154a. In the embodiment of the invention illustrated in FIG. 6, the plug 154a is held in the secondary section 78a of the piston 14a by an annular retainer ring 208 rather than by threads.

The apparatus 10a is assembled in the same manner as previously explained in conjunction with FIGS. 3–5. Thus, when the apparatus 10a is to be assembled, the piston 14a is inserted part way into the cylinder 12a. Lubricating liquid is then poured into the annular space 34a. Lubricating liquid is also poured into the piston chamber 30a. The piston chamber 30a is then closed by the plug 154a and the piston 14a is fully inserted into the cylinder 12a.

During reciprocation of the piston 14a in the cylinder 12a, the lubricating liquid circulates through the passage 32a between the body 28a of lubricating liquid and the body 35a of lubricating liquid. Thus, as the piston 14a is moved upwardly (as viewed in FIG. 6) the fluid pressure in the upper variable volume chamber 24a and the piston chamber 30a increases to provide a pumping action which forces liquid to flow into the annular body 35a of lubricating liquid. As the piston 14a is moved downwardly in the cylinder 12a to the extended position shown in FIG. 6, fluid pressure in the upper variable volume chamber 24a decreases with a resulting decrease in the fluid pressure in the piston chamber 30a. This results in a flow of lubricating liquid being conducted from the annular chamber 35a.

Third Embodiment

Figure 7:
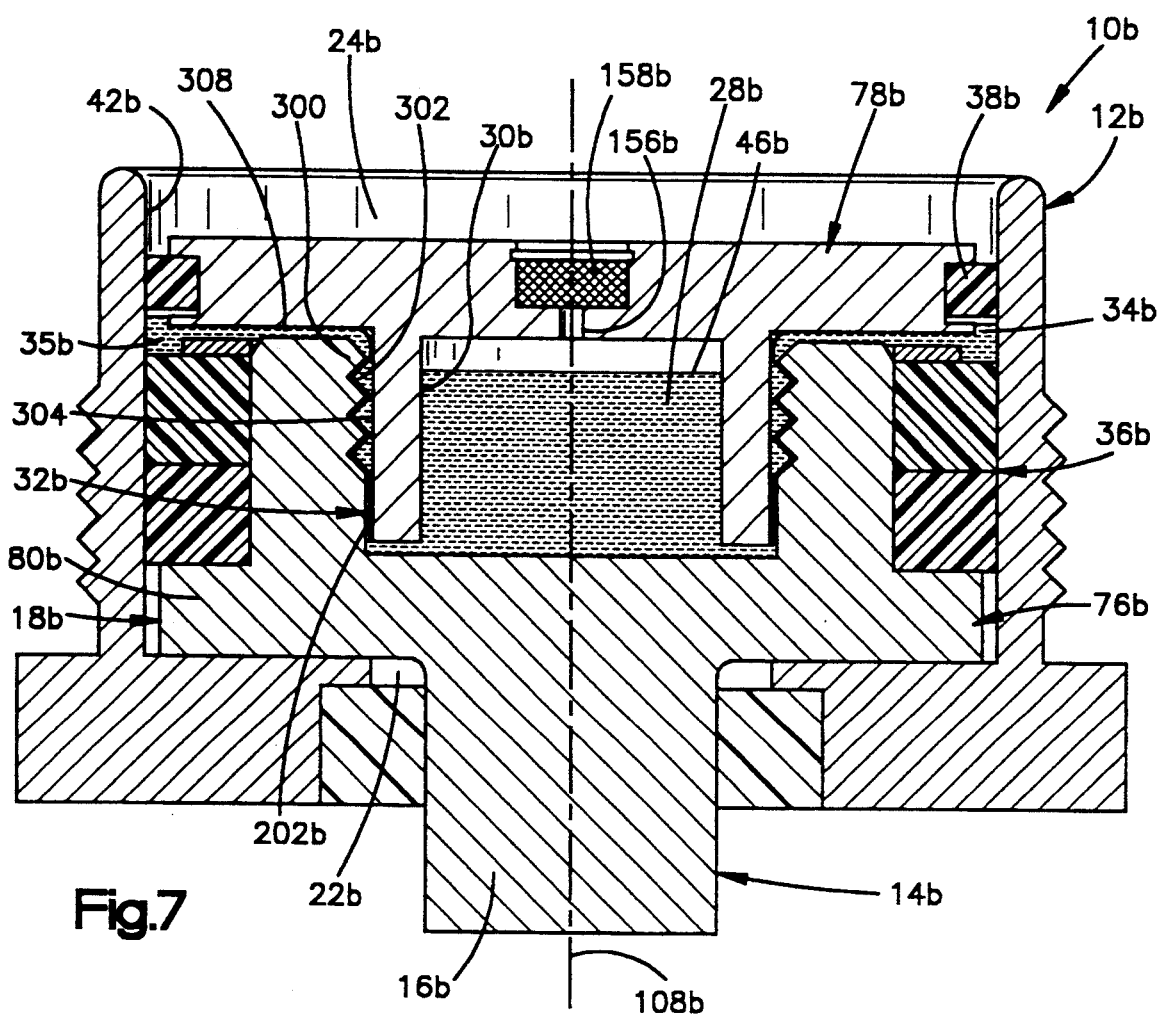
FIG. 7 is a sectional view of a third embodiment of the piston and cylinder assembly.
Figure 8:
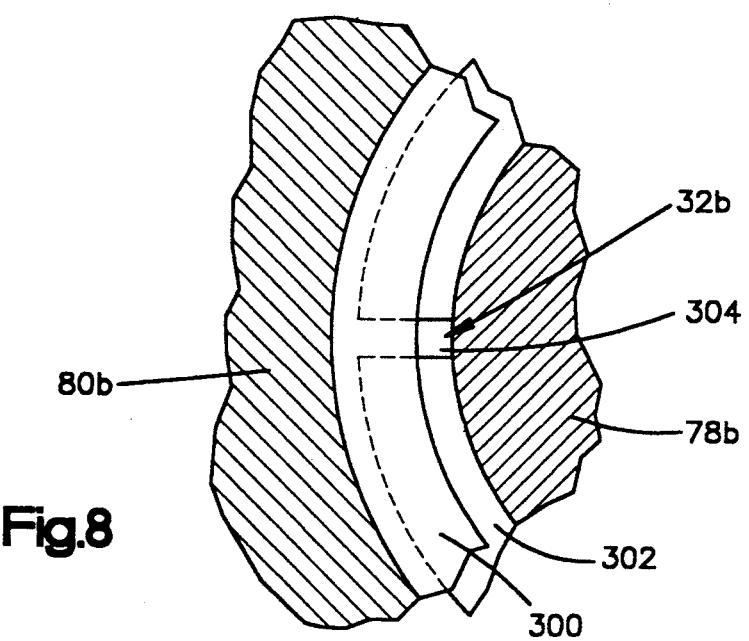
FIG. 8 is a fragmentary sectional view illustrating the manner in which a passage extends through inner and outer thread convolutions.

In the embodiment of the invention illustrated in FIG. 6, the apparatus 10a has a relatively long operating stroke. However, various machines may require the apparatus to have a relatively short operating stroke. The embodiment of the invention illustrated in FIGS. 7 and 8 is intended for use in a machine which requires the apparatus to have a short operating stroke. Since the embodiment of the invention illustrated in FIGS. 7 and 8 is generally similar to the embodiment of the invention illustrated in FIG. 6, similar numerals will be utilized to designate similar components, the suffix letter "b" being associated with the numerals of FIGS. 7 and 8 to avoid confusion.

An apparatus 10b (FIG. 7) for cushioning movement of a member in a machine includes a cylinder 12b and a piston 14b. The piston 14b includes a piston rod 16b and a piston head 18b. The piston head 18b divides the inside of the cylinder 12b into a lower variable volume chamber 22b and an upper variable volume chamber 24b.

The piston rod 16b (FIG. 7) is engageable by a component of a machine to cushion movement of the component of the machine during operation of the machine. Thus, force is applied against the piston rod 16b by the machine component. The force applied against the piston rod 16b moves the piston head 18b upward against the influence of fluid pressure in the upper variable volume chamber 24b to cushion movement of the machine component. The piston rod 16b and piston head 18b are moved through a relatively short operating stroke, for example, a stroke of 0.06 inches.

The piston 14b includes a one piece hollow main section 76b and a one piece hollow secondary section 78b. The main section 76b includes a lower part 80b of the piston head 18b and the piston rod 16b. An internal thread convolution 300 on the lower part 80b of the piston head 18b engages an external thread convolution 302 on the secondary section 78b of the piston head. The internal and external thread convolutions 300 and 302 interconnect the lower part 80b and the secondary section 78b of the piston head 18b.

A first body 28b of lubricating liquid, that is oil, is disposed in the piston 14b. The first body of lubricating liquid is contained in and partially fills a cylindrical chamber 30b in the piston 14b. A second body 35b of lubricating liquid is located in and partially fills an annular space 34b which circumscribes the piston 14b and the first body 28b of lubricating liquid.

In accordance with a feature of this embodiment of the invention, a passage 32b (FIG. 8) is partially formed in and extends axially through the thread convolutions 300 and 302. Thus, the passage 32b includes a slot 304 cut in the inner thread convolution 302. The slot 304 extends upward along the thread convolutions 300 and 302. The slot 304 extends upward past an upper side surface 46b (FIG. 7) of the body 28b of lubricating liquid in the piston chamber 30b.

The passage 32b has a lower end portion 202b (FIG. 7) which extends into a lower end portion of the piston chamber 30b. The passage 32b has an upper portion 308 which extends radially outward from the slot 304 and is connected in fluid communication with the body 35b of liquid in the annular space 34b. The passage 32b is filled with lubricating liquid.

The slot 304 has a central axis which extends parallel to a central axis 108b of the cylinder 12b. The slot 304 extends between upper and lower ends of the external thread convolution 302. The slot extends radially from the crest of the external thread convolution 302 to the root of the external thread convolution. The slot 304 forms only a portion of the passage 32b. Thus, the passage 32b extends axially downwardly from the thread convolution 302. The passage 32b also extends axially upwardly and radially outwardly of the thread convolution 302.

If desired the slot 304 could be formed in the internal thread convolution 300 or in both of the thread convolutions 300 and 302. Although the slot 304 has been shown as extending from the crest of the external thread convolution 302 to the root of the external thread convolution, the slot 304 could extend radially past the root of the external thread convolution into the material of the secondary section 78b.

The second body 35b of liquid is disposed between an annular lower seal 36b and an annular upper seal 38b on the piston head 18b. The second body 35b of lubricating liquid is connected in fluid communication with the first body 28b of lubricating liquid by the passage 32b which extends through the thread convolutions 300 and 302. The second body 35b of lubricating liquid (oil) is coaxial with and circumscribes the first body 28b of lubricating liquid.

During reciprocation of the piston 14b relative to the cylinder 12b, lubricating liquid is applied to a cylindrical inner side surface 42b of the cylinder 12b. This enables the lower seal 36b and the upper seal 38b to be fully lubricated during reciprocation of the piston 14b relative to the cylinder 12b. In addition, force is applied to the first and second bodies 28b and 35b of lubricating liquid during reciprocation of the piston 14b. This force causes the lubricating liquid to circulate in the piston chamber 30b, passage 32b and annular space 34b in such a manner as to transfer heat away from the inner side surface 42b of the cylinder 12b. In addition, the body 35b of lubricating liquid provides a fluid seal between the lower variable volume chamber 22b and the upper variable volume chamber 24b.

Fluid pressure is applied against an upper side surface 46b of the body 28b of lubricating liquid. The fluid pressure applied against the upper side surface 46b of the body 28b of lubricating liquid is transmitted through the lubricating liquid in the passage 32b to the second body 35b of lubricating liquid. The fluid pressure presses the lubricating liquid against the inner side surface 42b of the cylinder 12b and against the lower seal 36b. During reciprocation of the piston 14b in the cylinder 12b, variations in the fluid pressure in the upper variable volume chamber 24b results in a pumping action which is the same as previously explained in conjunction with the embodiment of the invention illustrated in FIGS. 1 and 2.

In the embodiment of the invention illustrated in FIGS. 7 and 8, fluid pressure which is applied against the upper side surface 46b of the body 28b of lubricating liquid is conducted from the upper variable volume chamber 24b through a filter 158b and passage 156b formed in the secondary section 76b of the piston 14b. It should be noted that in the embodiment of the invention illustrated in FIGS. 7 and 8, it is not necessary to provide a standpipe, corresponding to the standpipe 50 of the embodiment of the invention illustrated in FIGS. 1 and 2. This is because the upper side surface 46b of the body 28b of lubricating liquid faces upward.

The apparatus 10b is assembled in the same manner as previously explained in conjunction with FIGS. 3-5. Thus, when the apparatus 10b is to be assembled, the piston 14b is inserted part way into the cylinder 12b. Lubricating liquid is then poured into the annular space 34b. Lubricating liquid is also poured into the piston chamber 30b through the passage 156b. The piston chamber 30b is then closed by the filter 158b and the piston 14b is fully inserted into the cylinder 12b. Of course, the apparatus 10b could be assembled in a different manner if desired.

During reciprocation of the piston 14b in the cylinder 12b, the lubricating liquid circulates through the passage 32b between the body 28b of lubricating liquid and the body 35b of lubricating liquid. Thus, as the piston 14b is moved upwardly (as viewed in FIG. 7) the fluid pressure in the upper variable volume chamber 24b and the piston chamber 30b increases to provide a pumping action which forces liquid to flow into the annular body 35b of lubricating liquid. As the piston 14b is moved downwardly in the cylinder 12b to the extended position shown in FIG. 7, fluid pressure in the upper variable volume chamber 24b decreases with a resulting decrease in the fluid pressure in the piston chamber 30b. This results in a flow of lubricating liquid being conducted from the annular chamber 35b.

Conclusion

The present invention provides a new and improved method and apparatus 10 to cushion movement of a member in a machine. The apparatus includes a piston 14 which is disposed in a cylinder 12 and divides the cylinder into variable volume chambers 22 and 24. A body 28 of lubricating liquid is held in a chamber 30 in the piston 14. Lubricating liquid is conducted from the piston chamber 30 to a space 34 between upper and lower seals 36 and 38 on the piston 14. During reciprocation of the piston 14 in the cylinder 12, the body 28 of lubricating liquid in the piston is reciprocated with the piston. In addition, lubricating liquid is exposed to the side wall 42 of the cylinder 12 to lubricate the cylinder and seals 36 and 38 connected with the piston 14.

An upper side surface 46 of the body 28 of lubricating liquid in the piston 14 is exposed to a relatively high fluid pressure. This fluid pressure may be conducted from one of the variable volume cylinder chambers.

In one embodiment of the invention (FIGS. 1 and 2), the fluid pressure from one of the variable volume chambers 24 is conducted through the body 28 of lubricating liquid in the piston 14. Thus, a lower end of a conduit 50 is connected in fluid communication with the variable volume cylinder chamber 24. The upper end of the conduit 50 is disposed above an upper side surface 46 of the body of lubricating liquid 28 in the piston 14.

In another embodiment of the invention (FIG. 6 or FIG. 7), lubricating liquid is conducted upwardly from a lower end portion of the body 28a or 28b of lubricating liquid in the piston 14a or 14b to a space 34a or 34b between seals 36a and 38a or 36b and 38b on the piston. In this embodiment of the invention, a passage 32a or 32b for conducting lubricating liquid extends above an upper surface 46a or 46b of the body 28a or 28b of lubricating liquid in the piston 14a or 14b to the space between the seals 36a and 38a or 36b and 38b on the piston.

In both embodiments of the invention, during reciprocation of the piston 14 or 14a or 14b in the cylinder 12 or 12a or 12b, the body 28 or 28a or 28b of lubricating liquid in the piston is reciprocated with the piston. As the lubricating liquid reciprocates, the lubricating liquid circulates in such a manner as to transfer heat away from the cylinder 12 or 12a or 12b. At the same time, movement of lubricating liquid along an inner side surface 42 or 42a or 42b of the cylinder 12 or 12a or 12b applies lubricating liquid to the inner side surface of the cylinder.

To assemble the apparatus, the piston 14 or 14a or 14b is partially inserted into the cylinder 12 or 12a or 12b (FIG. 3). A space 34 or 34a or 34b between the seals 36 and 38 or 36a and 38a or 36b and 38b on the piston 14 or 14a or 14b is at least partially filled with lubricating liquid. The piston 14 or 14a or 14b is then inserted further into the cylinder 12 or 12a or 12b. In addition, the chamber 30 or 30a or 30b in the piston is at least partially filled with lubricating liquid.

Having described the invention, the following is claimed:

1. An apparatus to cushion movement of a member in a machine, said apparatus comprising a cylinder, a piston disposed in said cylinder and dividing said cylinder into first and second variable volume chambers, a first annular seal connected with said piston and disposed between said piston and cylinder, a second annular seal connected with said piston and disposed between said piston and cylinder, said piston, cylinder and first and second seals cooperating to at least partially define a space between said first and second seals, surface means disposed in said piston for at least partially defining a piston chamber, means for at least partially defining a passage extending from said piston chamber to the space between said first and second seals, a first body of lubricating liquid being disposed in said piston chamber, and a second body of lubricating liquid being disposed in the space between said first and second seals, said second body of lubricating liquid being disposed in engagement with said cylinder and being movable relative to said cylinder with said piston to apply lubricating liquid to said cylinder.

2. An apparatus as set forth in claim 1 further including means for conducting fluid pressure from said first variable volume chamber to said piston chamber to apply fluid pressure against said first body of lubricating liquid.

3. An apparatus as set forth in claim 2 wherein said means for conducting fluid pressure from said first variable volume chamber to said piston chamber includes means for conducting fluid pressure through said first body of lubricating liquid to an upper end portion of said piston chamber.

4. An apparatus as set forth in claim 3 wherein said means for conducting fluid pressure through said first body of lubricating liquid includes a conduit having a central axis which is coincident with a central axis of said piston, said conduit having an upper end portion which is disposed above said first body of lubricating liquid and a lower end portion which is connected with said piston.

5. An apparatus as set forth in claim 1 wherein said surface means includes a surface area which is disposed in said piston along a central axis of said piston and has upper and lower end portions, said lower end portion of said surface area being disposed at a lower level than one of said annular seals, said first body of lubricating liquid extending along said surface area from the lower end portion of said surface area into engagement with the upper end portion of said surface area.

6. An apparatus as set forth in claim 1 wherein said means for at least partially defining a passage includes means for defining a passage which extends outward away from a central axis of said piston to a location between said first and second seals.

7. An apparatus as set forth in claim 1 wherein said piston includes a lower end portion and a conduit which extends upward from said lower end portion of said piston through said first body of lubricating liquid, a lower end portion of said conduit being connected in fluid communication with said first variable volume chamber, an upper end portion of said conduit being connected in fluid communication with said piston chamber at a location above said first body of lubricating liquid.

8. An apparatus as set forth in claim 1 wherein said means for at least partially defining a passage includes means for defining a passage which extends upward from a location adjacent to a lower end portion of said piston chamber toward an upper end portion of said piston chamber and extends outward away from a central axis of said piston to a location between said first and second seals.

9. An apparatus as set forth in claim 1 said means for at least partially defining a passage includes a conduit which is at least partially disposed in said piston chamber and extends upward from a lower end portion of said piston chamber to a level above an upper side surface of said first body of lubricating liquid and extends outward away from a central axis of said piston chamber toward said second body of lubricating liquid.

10. An apparatus as set forth in claim 1 wherein said passage conducts lubricating liquid from said first body of lubricating liquid to said second body of lubricating liquid.

11. An apparatus as set forth in claim 1 wherein a portion of said passage is disposed above an upper side surface of said first body of lubricating liquid.

12. An apparatus as set forth in claim 1 wherein said passage is entirely disposed at a lower level than an upper side surface of said first body of lubricating liquid.

13. An apparatus as set forth in claim 1 wherein said second body of lubricating liquid has an annular configuration and circumscribes at least a portion of said first body of lubricating liquid.

14. An apparatus as set forth in claim 1 further including conduit means for conducting fluid pressure from said first variable volume chamber to a portion of said piston chamber which is disposed above said first and second bodies of lubricating liquid.

15. An apparatus as set forth in claim 14 wherein said conduit means is entirely disposed within said piston.

16. An apparatus as set forth in claim 1 wherein said piston includes first and second sections which are interconnected by internal and external thread convolutions, said means for defining a passage includes a slot which is formed in at least one of said first and second thread convolutions.

17. An apparatus to cushion movement of a member in a machine, said apparatus comprising a cylinder, a piston disposed in said cylinder and dividing said cylinder into first and second variable volume chamber, said piston having a head portion and a rod portion which extends through said second variable volume chamber, a first annular seal connected with said head portion of said piston and disposed in engagement with said cylinder, and a second annular seal connected with said head portion of said piston and disposed in engagement with said cylinder, said piston including a hollow main section which forms said rod portion of said piston and partially forms said head portion of said piston, said first seal being disposed on said main section of said piston, said piston including a hollow secondary section which is connected with said main section and cooperates with said main section to further form said head portion of said piston, said secondary section of said piston including a generally cylindrical base and a generally cylindrical central portion which is coaxial with said base and has a smaller diameter than said base, said central portion of said secondary section being telescopically disposed in said hollow main section of said piston, said second seal being disposed on said base of said secondary section of said piston in an axially spaced apart relationship with said first seal, said sections of said piston including surface means for defining a piston chamber for holding a body of lubricating liquid, and means for forming a passage which extends from said piston chamber to a space between said first and second sea Is.

18. An apparatus as set forth in claim 17 wherein said base of said secondary section of said piston includes a plug which closes one end portion of said piston chamber and conduit means which extends through said plug to conduct fluid pressure from said first variable volume chamber to said piston chamber.

19. An apparatus as set forth in claim 18 wherein said conduit means extends from said plug through at least a portion of said piston chamber to an end portion of said piston chamber opposite from said one end portion of said piston chamber.

20. An apparatus as set forth in claim 18 wherein said passage has an end portion which opens into said one end portion of said piston chamber.

21. An apparatus as set forth in claim 18 wherein said passage extends from an end portion of said piston chamber opposite from said one end portion to said one end portion of said piston chamber and extends from said one end portion of said piston chamber to the space between said first and second seals.

22. An apparatus as set forth in claim 18 further including filter means disposed in said plug for filtering fluid which is conducted through said conduit means.

23. An apparatus as set forth in claim 17 further including pressure relief valve means disposed in said hollow main section of said piston, said hollow main section of said piston including means for conducting fluid pressure from said second variable volume chamber to said pressure relief valve means and means for conducting fluid pressure from said pressure relief valve means to an atmosphere around said apparatus when the fluid pressure in said second variable volume chamber exceeds a predetermined pressure.

24. An apparatus as set forth in claim 17 wherein said main section and said secondary section of said piston are interconnected by internal and external thread convolutions, said means for forming a passage includes a slot which extends between axially opposite end portions of at least one of said thread convolutions and extends radially from a crest of the one thread convolution to at least a root of the one thread convolution.

25. A method of cushioning movement of a member in a machine, said method comprising the steps of reciprocating a piston containing a body of lubricating liquid in a cylinder to vary the volume of first and second variable volume chambers in the cylinder, applying fluid pressure against an upper side surface of the body of lubricating liquid in the piston as the piston is reciprocated in the cylinder, said step of applying fluid pressure against an upper side surface of the body of lubricating liquid in the piston includes conducting fluid pressure from the first variable volume chamber to the upper side surface of the body of lubricating liquid in the piston as the piston is reciprocated in the cylinder, and exposing an inner side surface of the cylinder to lubricating liquid under pressure transmitted from the upper side surface of the body of lubricating liquid in the piston to the inner side surface of the cylinder by lubricating liquid as the piston is reciprocated in the cylinder.

26. A method as set forth in claim 25 wherein said step of conducting fluid pressure from the first variable volume chamber to the upper side surface of the body of lubricating liquid in the piston includes conducting fluid pressure from the first variable volume chamber through the body of lubricating liquid in the piston during reciprocation of the piston.

27. A method as set forth in claim 25 further including the steps of transferring heat from the inner side surface of the cylinder to the body of lubricating liquid in the piston as the piston is reciprocated in the cylinder, said step of transferring heat from the inner side surface of the cylinder to the body of lubricating liquid includes inducing circulation of the lubricating liquid under the influence of forces applied against the body of lubricating liquid during reciprocation of the piston in the cylinder.

28. A method as set forth in claim 25 wherein said step of exposing an inner side surface of the cylinder to lubricating liquid includes moving a body of lubricating liquid disposed between an outer side surface of the piston and the inner side surface of the cylinder along the inner side surface of the cylinder.

29. A method as set forth in claim 28 wherein said step of exposing an inner side surface of the cylinder to lubricating liquid includes conducting lubricating liquid from the body of lubricating liquid in the piston to the body of lubricating liquid disposed between an outer side surface of the piston and an inner side surface of the cylinder.

30. A method as set forth in claim 29 wherein said step of conducting lubricating liquid from the body of lubricating in the piston to the body of lubricating liquid disposed between an outer side surface of the piston and the inner side surface of the cylinder includes conducting the lubricating liquid along a path which extends through thread convolutions which interconnect components of the piston.

31. A method comprising the steps of inserting a piston part way into a cylinder, said step of inserting a piston part way into a cylinder including moving a first seal on the piston into sealing engagement with an inner side surface of the cylinder with a second seal on the piston spaced from the inner side surface of the cylinder, at least partially filling a space between the inner side surface of the cylinder, the piston and the first seal with lubricating liquid, at least partially filling a chamber in the piston with lubricating liquid, further inserting the piston into the cylinder to move the second seal on the piston into sealing engagement with the inner side surface of the cylinder with lubricating liquid in the space between the first and second seals, thereafter, reciprocating the piston in the cylinder, and conducting lubricating liquid to and from the space between the first and second seals during reciprocation of the piston in the cylinder.

32. A method as set forth in claim 31 further including the step of applying fluid pressure against an upper side surface of the lubricating liquid in the chamber in the piston as the piston is reciprocated in the cylinder.

33. A method as set forth in claim 32 wherein said step of applying fluid pressure against an upper side surface of the lubricating liquid in the chamber in the piston includes conducting fluid pressure from a variable volume chamber in the cylinder to the upper side surface of the lubricating liquid in the piston as the piston is reciprocated in the cylinder.

34. A method as set forth in claim 33 wherein said step of conducting fluid pressure from variable volume chamber to the upper side surface of the lubricating liquid in the piston includes conducting fluid pressure from the variable volume chamber through the lubricating liquid in the chamber in the piston during reciprocation of the piston.

35. A method as set forth in claim 33 wherein said step of conducting lubricating liquid to and from the space between the first and second seals during reciprocation of the piston in the cylinder includes conducting liquid along a passage which extends above the upper side surface of the lubricating liquid in the chamber.

36. An apparatus to cushion movement of a member in a machine, said apparatus comprising a cylinder, and a piston disposed in said cylinder and dividing said cylinder into first and second variable volume chambers, said piston having a head portion and a rod portion which extends through said second variable volume chamber, said piston having first and second annular seals connected with said head portion of said piston and disposed in engagement with said cylinder, said piston having first and second sections which are interconnected by internal and external thread convolutions, said first and second sections of said piston at least partially defining a piston chamber for holding a body of lubricating liquid and means for forming a passage which extends from said piston chamber to a space between said first and second seals, said means for defining a passage including a slot which extends through said internal and external thread convolutions and extends between axially opposite end portions of said internal and external thread convolutions.

37. An apparatus as set forth in claim 36 further including a first body of lubricating liquid disposed in said piston chamber and a second body of lubricating liquid disposed in the space between said first and second annular seals, said first body of lubricating liquid connected in fluid communication with said second body of lubricating liquid through said passage.

38. An apparatus as set forth in claim 36 wherein said slot extends from a crest portion of one of said thread convolutions at least to a root portion of the one thread convolution.

39. An apparatus as set forth in claim 38 further including means for conducting fluid pressure from one of said variable volume chambers to said piston chamber to urge lubricating liquid to flow from said piston chamber to the space between said first and second seals.

* * * * *

UNITED STATES PATENT AND TRADEMARK OFFICE
CERTIFICATE OF CORRECTION

PATENT NO. : 5,339,932
DATED : August 23, 1994
INVENTOR(S) : Harold L. Lanterman It is certified that error appears in the above-indentified patent and that said Letters Patent is hereby corrected as shown below:

Column 15, line 31, change "sea Is" to --seals--.

Signed and Sealed this

Fourteenth Day of February, 1995

Attest:

BRUCE LEHMAN

Attesting Officer     Commissioner of Patents and Trademarks